United States Patent
Reitz et al.

(10) Patent No.: US 9,850,812 B2
(45) Date of Patent: Dec. 26, 2017

(54) ENGINE COMBUSTION CONTROL AT LOW LOADS VIA FUEL REACTIVITY STRATIFICATION

(71) Applicant: Wisconsin Alumni Research Foundation, Madison, WI (US)

(72) Inventors: Rolf Deneys Reitz, Madison, WI (US); Reed M. Hanson, Riverton, MN (US); Derek A. Splitter, Madison, WI (US); Sage Kokjohn, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 442 days.

(21) Appl. No.: 14/506,766

(22) Filed: Oct. 6, 2014

(65) Prior Publication Data
US 2015/0034045 A1 Feb. 5, 2015

Related U.S. Application Data

(63) Continuation of application No. 13/077,378, filed on Mar. 31, 2011, now Pat. No. 8,851,045.

(51) Int. Cl.
*F02D 41/00* (2006.01)
*F02B 69/02* (2006.01)
(Continued)

(52) U.S. Cl.
CPC ........... *F02B 69/02* (2013.01); *F02B 1/14* (2013.01); *F02B 17/005* (2013.01);
(Continued)

(58) Field of Classification Search
CPC ...... F02B 1/00; F02B 3/06; F02B 7/02; F02B 17/00; F02D 41/0025; F02D 19/08
(Continued)

(56) References Cited

U.S. PATENT DOCUMENTS

| 673,160 A | 4/1901 | Diesel |
| 2,767,691 A | 10/1956 | Mengelkamp et al. |

(Continued)

FOREIGN PATENT DOCUMENTS

| EP | 1975394 A2 | 10/2008 |
| JP | 2000-179368 | 6/2000 |

(Continued)

OTHER PUBLICATIONS

Clean Air Power Duel Fuel Press Release, 2007.
(Continued)

*Primary Examiner* — Thomas Moulis
(74) *Attorney, Agent, or Firm* — Craig A. Fieschko, Esq.; DeWitt Ross & Stevens S.C.

(57) ABSTRACT

A compression ignition (diesel) engine uses two or more fuel charges during a combustion cycle, with the fuel charges having two or more reactivities (e.g., different cetane numbers), in order to control the timing and duration of combustion. By appropriately choosing the reactivities of the charges, their relative amounts, and their timing, combustion can be tailored to achieve optimal power output (and thus fuel efficiency), at controlled temperatures (and thus controlled NOx), and with controlled equivalence ratios (and thus controlled soot). At low load and no load (idling) conditions, the aforementioned results are attained by restricting airflow to the combustion chamber during the intake stroke (as by throttling the incoming air at or prior to the combustion chamber's intake port) so that the cylinder air pressure is below ambient pressure at the start of the compression stroke.

29 Claims, 4 Drawing Sheets

(51) Int. Cl.

| | | |
|---|---|---|
| *F02B 1/14* | (2006.01) | |
| *F02M 43/00* | (2006.01) | |
| *F02D 41/08* | (2006.01) | |
| *F02D 41/30* | (2006.01) | |
| *F02D 19/08* | (2006.01) | |
| *F02D 13/02* | (2006.01) | |
| *F02B 17/00* | (2006.01) | |
| *F02M 69/04* | (2006.01) | |
| *F02D 11/10* | (2006.01) | |

(52) U.S. Cl.
CPC ....... *F02D 13/0234* (2013.01); *F02D 19/081* (2013.01); *F02D 41/0002* (2013.01); *F02D 41/006* (2013.01); *F02D 41/0025* (2013.01); *F02D 41/08* (2013.01); *F02D 41/3017* (2013.01); *F02M 43/00* (2013.01); *F02D 11/105* (2013.01); *F02D 2041/001* (2013.01); *F02D 2041/0022* (2013.01); *F02D 2041/3052* (2013.01); *F02M 69/044* (2013.01); *F02M 69/046* (2013.01); *Y02T 10/18* (2013.01); *Y02T 10/36* (2013.01); *Y02T 10/42* (2013.01); *Y02T 10/47* (2013.01)

(58) Field of Classification Search
USPC .......................................... 123/295, 304, 305
See application file for complete search history.

(56) References Cited

U.S. PATENT DOCUMENTS

| | | | |
|---|---|---|---|
| 2,988,065 A | 6/1961 | Wankel et al. | |
| 3,986,351 A * | 10/1976 | Woods | F01L 1/348 123/316 |
| 4,147,137 A * | 4/1979 | Firey | F02B 17/00 123/430 |
| 4,656,984 A | 4/1987 | Southard | |
| 5,094,204 A | 3/1992 | King | |
| 5,313,920 A * | 5/1994 | Matsushita | F02D 33/00 123/295 |
| 5,315,973 A | 5/1994 | Hill et al. | |
| 6,164,263 A | 12/2000 | Saint-Hilaire et al. | |
| 6,244,241 B1 | 6/2001 | Mamiya et al. | |
| 6,244,243 B1 | 6/2001 | Mamiya et al. | |
| 6,314,940 B1 * | 11/2001 | Frey | F02B 23/101 123/430 |
| 6,516,774 B2 * | 2/2003 | zur Loye | F02B 1/12 123/299 |
| 6,526,939 B2 * | 3/2003 | Reitz | F02D 41/401 123/295 |
| 6,561,157 B2 | 5/2003 | Zur Loye et al. | |
| 6,598,584 B2 | 7/2003 | Beck et al. | |
| 6,659,065 B1 | 12/2003 | Renegar | |
| 6,668,789 B1 * | 12/2003 | Marriott | F02D 41/3047 123/295 |
| 6,675,748 B2 | 1/2004 | Ancimer et al. | |
| 6,722,321 B2 | 4/2004 | Kim | |
| 6,725,827 B2 | 4/2004 | Ueda et al. | |
| 6,736,106 B2 | 5/2004 | Reitz et al. | |
| 6,813,880 B2 * | 11/2004 | Nishiyama | F01N 3/0842 123/431 |
| 6,892,692 B2 | 5/2005 | Barrett | |
| 6,983,729 B2 | 1/2006 | Schapiro et al. | |
| 7,021,277 B2 * | 4/2006 | Kuo | F02D 13/0215 123/295 |
| 7,036,482 B2 | 5/2006 | Beck et al. | |
| 7,121,254 B2 | 10/2006 | Wickman et al. | |
| 7,128,046 B1 * | 10/2006 | Dec | F02B 17/00 123/295 |
| 7,178,502 B2 | 2/2007 | Okulov | |
| 7,284,506 B1 * | 10/2007 | Sun | F02D 19/081 123/1 A |
| 7,337,763 B2 | 3/2008 | Reitz et al. | |
| 7,367,309 B2 * | 5/2008 | Hashimoto | C10L 1/06 123/1 A |
| 7,409,926 B2 | 8/2008 | Sun et al. | |
| 7,412,821 B2 * | 8/2008 | Araki | F02D 37/02 60/284 |
| 7,431,010 B2 * | 10/2008 | Juretzka | F02D 41/403 123/299 |
| 7,444,986 B2 | 11/2008 | Shute | |
| 7,461,628 B2 | 12/2008 | Blumberg et al. | |
| 7,464,690 B1 | 12/2008 | Reitz et al. | |
| 7,487,766 B2 | 2/2009 | Alger et al. | |
| 7,712,451 B2 | 5/2010 | Hung et al. | |
| 7,721,703 B2 * | 5/2010 | Kakuho | F02B 17/005 123/304 |
| 7,771,675 B2 | 8/2010 | Hotta et al. | |
| 7,866,148 B2 * | 1/2011 | O'Neill | F01N 3/0842 123/568.11 |
| 8,042,516 B2 * | 10/2011 | Takahashi | F01L 1/3442 123/348 |
| 9,051,887 B2 * | 6/2015 | Willi | F02B 17/00 |
| 9,080,501 B2 * | 7/2015 | Reitz | F02B 23/0669 |
| 2003/0136375 A1 * | 7/2003 | Reitz | F01L 1/34 123/316 |
| 2003/0187565 A1 | 10/2003 | Wong | |
| 2003/0233996 A1 * | 12/2003 | Marriott | F02D 41/3047 123/295 |
| 2004/0025829 A1 * | 2/2004 | Wuerfel | F02B 1/08 123/295 |
| 2005/0252483 A1 * | 11/2005 | Ganz | F02B 17/00 123/299 |
| 2006/0102145 A1 * | 5/2006 | Cohn | F02B 47/04 123/406.29 |
| 2006/0180099 A1 * | 8/2006 | Aimoto | F02B 51/02 123/1 A |
| 2006/0196469 A1 * | 9/2006 | Kuo | F02M 26/01 123/305 |
| 2006/0201481 A1 * | 9/2006 | Reitz | F02D 13/0207 123/316 |
| 2006/0225694 A1 * | 10/2006 | Brachert | F02D 13/0265 123/295 |
| 2006/0243241 A1 * | 11/2006 | Kuo | F01L 13/00 123/295 |
| 2007/0119411 A1 * | 5/2007 | Kerns | F02D 19/084 123/295 |
| 2007/0119424 A1 * | 5/2007 | Leone | F02D 19/0692 123/461 |
| 2007/0169742 A1 * | 7/2007 | Brachert | F02B 1/12 123/299 |
| 2007/0209633 A1 * | 9/2007 | Brachert | F02B 47/08 123/295 |
| 2007/0256648 A1 * | 11/2007 | Sun | F02D 19/081 123/1 A |
| 2008/0017136 A1 | 1/2008 | Sciamanna et al. | |
| 2008/0035125 A1 * | 2/2008 | Jankovic | F02D 13/0234 123/556 |
| 2008/0053408 A1 | 3/2008 | Futonagne et al. | |
| 2008/0257304 A1 * | 10/2008 | Noda | F02B 17/005 123/305 |
| 2008/0295798 A1 * | 12/2008 | Reitz | F02D 41/3035 123/299 |
| 2009/0043479 A1 * | 2/2009 | Noda | F02D 13/02 701/103 |
| 2009/0093949 A1 * | 4/2009 | Boyer | F02B 17/00 701/105 |
| 2009/0165759 A1 * | 7/2009 | Sengupta | F02D 19/0628 123/575 |
| 2009/0229541 A1 * | 9/2009 | Shimasaki | F02B 1/12 123/3 |
| 2009/0282812 A1 * | 11/2009 | Hu | B60K 6/24 60/285 |
| 2010/0065016 A1 * | 3/2010 | Bromberg | F02D 19/081 123/295 |
| 2010/0147261 A1 * | 6/2010 | Yamaguchi | F02B 17/00 123/295 |
| 2010/0198481 A1 * | 8/2010 | Bromberg | F02D 19/081 701/102 |

(56) References Cited

U.S. PATENT DOCUMENTS

| | | | |
|---|---|---|---|
| 2010/0199547 A1 | 8/2010 | Reed | |
| 2010/0258097 A1 | 10/2010 | Takahashi et al. | |
| 2010/0268442 A1* | 10/2010 | Kabashima | F02D 41/0025 701/103 |
| 2010/0269782 A1 | 10/2010 | Minick et al. | |
| 2011/0056123 A1 | 3/2011 | DiFrancesco et al. | |
| 2011/0192367 A1* | 8/2011 | Reitz | F02B 23/0669 123/1 A |
| 2013/0047945 A1 | 2/2013 | Reed | |
| 2013/0118060 A1 | 5/2013 | Reed | |
| 2013/0186366 A1* | 7/2013 | Reitz | F02B 53/10 123/205 |
| 2013/0230444 A1 | 9/2013 | Reed | |
| 2014/0026855 A1* | 1/2014 | Gehrke | F02B 1/12 123/445 |
| 2014/0026859 A1* | 1/2014 | Gehrke | F02M 43/00 123/478 |
| 2014/0032080 A1* | 1/2014 | Gehrke | F02D 41/402 701/104 |
| 2014/0032081 A1* | 1/2014 | Willi | F02B 23/0672 701/104 |
| 2014/0032082 A1* | 1/2014 | Gehrke | F02D 43/00 701/104 |
| 2014/0032084 A1* | 1/2014 | Gehrke | F02D 41/08 701/105 |

FOREIGN PATENT DOCUMENTS

| | | |
|---|---|---|
| JP | 2003-532829 | 11/2003 |
| JP | 2007-32402 | 2/2007 |
| JP | 2007-231937 | 9/2007 |
| JP | 2007-303403 A | 11/2007 |
| JP | 2009-138609 | 6/2009 |
| JP | 2009-287482 | 12/2009 |
| JP | 2010-502820 | 1/2010 |
| JP | 2011-58400 | 3/2011 |
| WO | WO 9504876 A1 | 2/1995 |
| WO | WO 2004/113705 A1 | 12/2004 |
| WO | WO 2007/115594 A1 | 10/2007 |
| WO | WO 2009/064028 A1 | 5/2009 |

OTHER PUBLICATIONS

Clean Air Power Duel Fuel Press Release, 2009.

Curran, S., Prikhodko, V., Wagner, R., Cho, K., Sluder, C., Kokjohn, S., and Reitz, R.D., "In-Cylinder Fuel Blending of Gasoline/Diesel for Improved Efficiency and Lowest Possible Emissions on a Multi-Cylinder Engine," SAE Paper 2010-01-2206, 2010.

Hanson, R., Reitz, R.D., Splitter, D., and Kokjohn, S., "An Experimental Investigation of Fuel Reactivity Controlled PCCI Combustion in a Heavy-Duty Engine," SAE paper 2010-01-0864, 2010.

Hanson, R.M., Kokjohn, S.L., Splitter, D.A., and Reitz, R.D., "Fuel Effects on Reactivity Controlled Compression Ignition (RCCI) Combustion at Low Load," SAE Paper 2011-01-0361, 2011.

Inagaki et al., "Dual-fuel PCI Combustion Controlled by In-Cylinder Stratification of Ingitability," SAE paper 2006-01-0028, 2006.

Kokjohn, S, Hanson, R., Splitter, D, and Reitz, R.D., "Experiments and Modeling of Dual Fuel HCCI and PCCI Combustion Using In-Cylinder Fuel Blending," SAE paper 2009-01-2647, SAE Int. J. Engines, vol. 2, No. 2, pp. 24-39, 2009.

Kokjohn, S.L. and Reitz, R.D., "A Modeling Study of Charge Preparation in an HCCI Engine Using a Variable Pressure Pulse (VVP) Injection System and Optimized PRF Blends," ICLASS—2009, 11$^{th}$ Triennial International Annual Conference on Liquid Atomization and Spray Systems, Vail, Colorado USA, Jul. 30, 2009.

Kokjohn, S.L., Hanson, R.M., Splitter, D.A., Kaddatz, J., and Reitz, R.D., "Fuel Reactivity Controlled Compression Ignition (RCCI) Combustion in Light- and Heavy-duty Engines," Sae Paper 2011-01-0357, 2011.

Kokjohn, S.L., Hanson, R.M., Splitter, D.A., and Reitz, R.D., "Fuel Reactivity Controlled Compression Ignition (RCCI): A Pathway to Controlled High-Efficiency Clean Combustion," International Journal of Engine Research, Special Issue on Fuel Efficiency, (in Press) Feb. 2011.

Puduppakkam, K.V., Liang, L., Naik, C.V., Meeks, E., Kokjohn, S.L., and Reitz, R.D., "Use of Detailed Kinetics and Advanced Chemistry-Solution Techniques in CFD to Investigate Dual-Fuel Engine Concepts," SAE paper 2011-01-0895, 2011.

Splitter, D.A., Hanson, R., Kokjohn, S., Rein, K., Sanders, S., and Reitz, R.D., "An Optical Investigation of Ignition Processes in Fuel Reactivity Controlled PCCI Combustion," SAE paper 2010-01-0345, SAE Int. J. Engines, vol. 3, No. 1 , pp. 142-162, 2010.

Splitter, D.A., Hanson, R., and Reitz, R.D., "High Efficiency, Low Emissions RCCI Combustion by Use of a Fuel Additive", SAE paper 2010-01-2167, SAE International Journal of Fuels and Lubricants, Dec. 2010 vol. 3 No. 2 742-756.

Splitter, D.A., Hanson, R.M., Kokjohn, S.L., and Reitz, R.D., "Improving engine performance by optimizing fuel reactivity in a dual-fuel PCCI strategy," THIESEL 2010 Conference on Thermo- and Fluid Dynamic Processes in Diesel Engines, Valencia, Spain, Sep. 13-16, 2010.

Splitter, D.A., Hanson, R.M., Kokjohn, S.L., and Reitz, R.D., "Reactivity Controlled Compression Ignition (RCCI) Heavy-Duty Engine Operation at Mid-and High-Loads with Conventional and Alternative Fuels," SAE Paper 2011-01-0363, 2011.

Sun, Y. and Reitz, R.D., "Modeling Diesel Engine NOx and Soot Reduction with Optimized Two-Stage Combustion," SAE paper 2006-01-0027, 2006.

* cited by examiner

ENGINE COMBUSTION CONTROL AT LOW LOADS VIA FUEL REACTIVITY STRATIFICATION

CROSS-REFERENCE TO RELATED APPLICATIONS

This application is a continuation of U.S. patent application Ser. No. 13/077,378 filed Mar. 31, 2011 (now U.S. Pat. No. 8,851,045 issued Oct. 7, 2014).

STATEMENT REGARDING FEDERALLY SPONSORED RESEARCH

This invention was made with government support under DE-AC04-94AL85000 awarded by the U.S. Department of Energy. The government has certain rights in this invention.

FIELD OF THE INVENTION

This document concerns an invention relating generally to combustion optimization methods for compression ignition (diesel) engines, and more specifically to combustion optimization methods resembling those described in prior related U.S. patent application Ser. No. 12/793,808 (filed on Feb. 11, 2010), but adapted for diesel engines operating at low loads.

BACKGROUND OF THE INVENTION

Diesel (compression ignition) engines are among the most energy-efficient engines available, with admirably high power output per fuel consumption. Unfortunately, they're also among the "dirtiest" engines available, with common diesel engines (at the time of this document's preparation) being prone to high production of nitrogen oxides (commonly denoted NOx), which result in adverse effects such as smog and acid rain, and particulates (often simply called "soot"), sometimes seen as the black smoke emitted by a diesel vehicle as it accelerates from a stop. Soot particularly tends to be a problem when diesel engines are idling or operating at low loads, and for this reason, many areas of the United States have adopted "anti-idling" laws limiting the amount of time that a diesel vehicle can be left idling.

Because of the impact of soot and NOx emissions on the environment, the United States and many other countries have also imposed stringent emissions regulations on the use of diesel engines in vehicles, and numerous technologies have been developed which attempt to reduce diesel emissions. As an example, NOx is generally associated with high-temperature engine conditions, and may therefore be reduced by use of measures such as exhaust gas recirculation (EGR), wherein the engine intake air is diluted with relatively inert exhaust gas (generally after cooling the exhaust gas), thereby reducing the oxygen in the combustion chamber and reducing the maximum combustion temperature. As another example, soot is generally associated with incomplete combustion, and can therefore be reduced by increasing combustion temperatures, or by providing more oxygen to promote oxidation of the soot particles. Unfortunately, measures which reduce NOx production in an engine tend to increase soot production, and measures which reduce soot production in an engine tend to increase NOx production, resulting in what is often termed the "soot-NOx tradeoff."

NOx and soot can also be addressed after they leave the engine (e.g., in the exhaust stream), but such "after-treatment" methods tend to be expensive to install and maintain. As examples, the exhaust stream may be treated with catalysts and/or injections of urea or other reducing/reacting agents to reduce NOx emissions, and/or fuel can periodically be injected and ignited in the exhaust stream to burn off soot collected in "particulate traps." These approaches require considerable expense and complexity, and in the case of particulate traps, they tend to reduce a vehicle's fuel efficiency.

Other technologies have more fundamentally focused on how to reduce both NOx and soot generation from the combustion process and thereby obtain cleaner "engine out" emissions (i.e., emissions directly exiting the engine, prior to exhaust after-treatment or similar measures). These approaches include modifying the timing, rate, and/or shape of fuel injection charges, modifying the combustion chamber shape, and/or modifying other factors to try to attain complete combustion of all fuel (and thus lower soot) while controlling the combustion temperature (thus controlling NOx). Many of these technologies provide emissions improvements, but are difficult to implement and control, particularly over the complete range of speeds and loads over which common diesel vehicle engines must operate. Additionally, many of these technologies still require measures such as exhaust after-treatment to attain emissions targets, leading to the aforementioned issues with cost and fuel efficiency.

Because of the difficulties in complying with emissions regulations while providing the fuel efficiency, cost, and performance that consumers seek, many automotive companies have simply shifted their focus away from diesel engines to the use of gasoline engines. Gasoline engines unfortunately have lower energy efficiency, and their emissions are also of concern. (For the reader having limited familiarity with internal combustion engines, the primary difference between gasoline engines and diesel engines is the manner in which combustion is initiated. Gasoline engines—also commonly referred to as spark ignition or "SI" engines—provide a relatively fuel-rich mixture of air and fuel into an engine cylinder, with a spark then igniting the mixture to drive the piston outwardly from the cylinder to generate work. In diesel engines—also known as compression ignition engines—fuel is introduced into an engine cylinder as the piston compresses the air therein, with the fuel then igniting under the compressed high pressure/high temperature conditions to drive the piston outwardly from the cylinder to generate work.)

A prior patent application by the inventors—U.S. patent application Ser. No. 12/793,808, filed Feb. 11, 2010 (and incorporated by reference herein)—describes diesel combustion methods, now referred to as Reactivity-Controlled Compression Ignition (RCCI) methods, wherein the fuel provided to the engine's combustion chamber is adapted to have its reactivity vary over the course of a combustion cycle. ("Reactivity" is a property corresponding to a fuel's tendency to spontaneously ignite under diesel operation conditions, i.e., under high pressures and temperatures. Thus, reactivity generally corresponds to a fuel's cetane number, or the converse of the fuel's octane number). In these RCCI methods, the fuel is also provided to the combustion chamber in such a manner that a stratified distribution of fuel reactivity results, that is, spaced regions of high reactivity and low reactivity are situated within the combustion chamber during the compression stroke of the combustion cycle. During compression, the higher-reactivity regions ignite first, with combustion then propagating to the lower-reactivity regions. With appropriate tailoring of fuel reactivity, fuel/reactivity amounts and proportions, the timing of fuel introduction into the combustion chamber, and similar factors, combustion can be tailored to produce peak work output at the desired time (for optimal power output), with low NOx and soot production. Experimental engines implementing RCCI methods resulted in exceptionally high fuel efficiency while meeting U.S. government emissions standards applicable at that time, without the need for exhaust gas after-treatment.

To review preferred versions of the RCCI methods in greater detail, an initial fuel charge having a first reactivity is supplied to the combustion chamber during the intake and/or compression stroke, preferably sufficiently early that the initial fuel charge is highly premixed with the air in the combustion chamber during a major portion of the compression stroke. One or more subsequent fuel charges of different reactivity are thereafter supplied to the combustion chamber in such a manner that a stratified distribution of fuel reactivity results within the combustion chamber, with distinct regions of higher and lower fuel reactivity. More specifically, the later different-reactivity charges are timed and otherwise designed to distribute the different-reactivity charges—which will be introduced into a preferably highly premixed "matrix" of air and first-reactivity fuel—in such a manner that the reactivity gradient within the combustion chamber provides a desired combustion start time and rate (a time/rate that results in controlled heat release resulting in superior work input to the piston), while deterring rapid pressure increases and high temperatures (which promote NOx production and reduce fuel economy), and while completely burning all (or nearly all) fuel within the combustion chamber to reduce unburnt hydrocarbons. Combustion tends to begin in one or more regions of highest reactivity (these regions being generated via the introduction of the higher-reactivity material), and spreads therefrom via volumetric energy release and/or flame propagation until all fuel from all charges is consumed. Thus, tailoring of the reactivity distribution within the combustion chamber can allow tailoring of the nature of the combustion process. Greater stratification/gradation in reactivity tends to result in a lower combustion rate. Conversely, lower stratification/gradation in reactivity (greater uniformity in reactivity throughout the combustion chamber) tends to result in a higher combustion rate, since each location within the chamber has an approximately equal chance of igniting first, and those that do not ignite first will be rapidly ignited by their neighbors.

The different fuel charges, with their differing reactivities, can be conventional fuels supplied to the engine from separate conventional tanks, e.g., diesel fuel (which has a higher reactivity) from one tank, and gasoline (which has lower reactivity) from another tank. Alternatively or additionally, fuel from a single tank can have its reactivity modified between higher and lower levels by the addition of an appropriate reactivity modifier. As an example, an initial lower-reactivity charge could simply contain gasoline or diesel fuel, and a subsequent higher-reactivity fuel charge could contain the gasoline or diesel fuel with a small amount of Di-Tertiary Butyl Peroxide (DTBP), 2-ethyl hexyl nitrate, or another cetane improver. An arrangement of this nature is useful since many reactivity modifiers are only needed in very dilute amounts, and thus a smaller tank for containing a reactivity modifier could be provided in a vehicle along with a conventional fuel tank arrangement, and with a metering arrangement that mixes a desired amount of reactivity modifier into the fuel line (or into a high-reactivity fuel line separate from a low-reactivity fuel line) when appropriate. To illustrate, a conventional diesel vehicle with a supplementary 1-2 quart tank containing DTBP would only require refilling every 3000-6000 miles or so, which is roughly the recommended frequency for an oil change, and thus the reactivity modifier tank could be refilled when the vehicle's oil is changed.

To review the reactivity stratification in greater detail, the initial first-reactivity fuel charge is supplied into the combustion chamber sufficiently prior to Top Dead Center (TDC) that the initial fuel charge is at least partially premixed (homogeneously dispersed) within the combustion chamber before the subsequent injection(s) is/are made. The initial charge may be introduced into the combustion chamber via (preferably low-pressure) direct injection into the cylinder, and/or by providing it through the combustion chamber's intake port, as by injecting or otherwise introducing the charge into the intake manifold, and/or into an intake runner extending therefrom. A first subsequent high-reactivity fuel charge is then supplied to the combustion chamber during approximately the first half of the compression stroke, preferably between the time the intake port is closed and approximately 40 degrees before TDC. More particularly, for a typical combustion chamber which is partially bounded by a piston face with a central bowl, as depicted in FIGS. 1A-1D, the first subsequent fuel charge is preferably introduced at such a time (and with such pressure) that at least a major portion of the first subsequent fuel charge is directed toward an outer (squish) region located at or near an outer radius of the piston face. More specifically, the first subsequent fuel charge is directed toward a region located outside of an outer third of the radius of the piston face. This is exemplified by FIG. 1B, which shows the combustion chamber at approximately 60 degrees before TDC, and with an injection being directed by the injector toward the squish region. However, in all instances injection is always preferably provided at pressures which avoid or minimize charge impingement on combustion chamber surfaces, since such impingement tends to enhance soot production.

A second subsequent high-reactivity fuel charge is then supplied to the combustion chamber after the first subsequent fuel charge. FIG. 1C depicts such an injection being made at approximately 30 degrees before TDC, with at least a major portion of the injection being directed toward an inner (bowl) region spaced inwardly from the outer radius of the piston face. More specifically, at least a major portion of the second subsequent fuel charge is preferably injected toward a region located inside an outer fourth of the radius of the piston face (i.e., it is injected toward a region defined by the inner 75% of the bore radius). In the meantime, the first subsequent fuel charge has begun to diffuse from the squish region, and to mix with the low-reactivity fuel from the initial fuel charge to form a region of intermediate reactivity at or near the squish region.

Figure 1A:
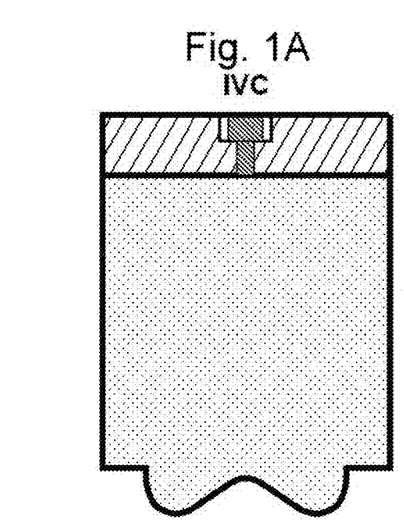
FIGS. 1A-1D schematically illustrate the cross-sectional area of a combustion chamber of a diesel (compression ignition) engine as its piston moves from a position at or near Bottom Dead Center (FIG. 1A) to a position at or near Top Dead Center (FIG. 1D), showing an engine combustion method exemplifying the invention wherein a first low-reactivity fuel charge is already at least substantially homogeneously dispersed within the chamber in FIG. 1A, a first subsequent high-reactivity fuel charge is injected into the chamber in FIG. 1B, and a second subsequent high-reactivity fuel charge is injected into the chamber in FIG. 1C.
Figure 1B:
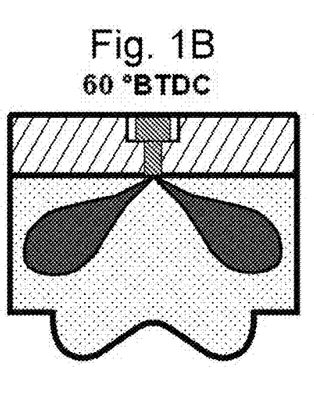
Figure 1C:
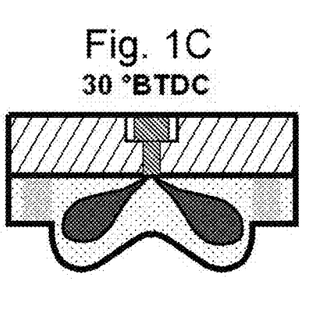
Figure 1D:
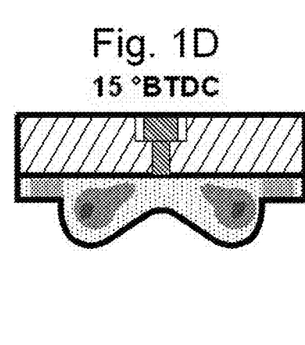

FIG. 1D then illustrates the combustion chamber of FIG. 1B at approximately 15 degrees before TDC, with the fuel in the chamber having a reactivity gradient ranging from higher-reactivity regions in the bowl to lower-reactivity regions at the outer diameter of the chamber, and at the crown of the bowl. Combustion may begin around this time, starting at the higher-reactivity region(s) and then propagating to the lower-reactivity regions over time.

Basically the same combustion mechanism results if the reactivities of the charges of FIGS. 1A-1D are reversed, i.e., if one or more initial higher-reactivity charges are followed by one or more subsequent lower-reactivity charges: ignition begins in the higher-reactivity regions and propagates to the lower-reactivity regions. The start and duration of combustion can be controlled by the timings and amounts of the fuel charges, which affect the degree of stratification attained. For optimal work output, it is desirable that the fuel charges are supplied to the combustion chamber to attain peak cylinder pressure at or after Top Dead Center (TDC), more preferably between TDC and 20 degrees ATDC (After TDC), and most preferably between 5 and 15 degrees ATDC. In similar respects, CA50 (i.e., 50% of the total fuel mass burned) preferably occurs between approximately 0 to 10 degrees ATDC. It is also useful to supply the fuel charges in such a manner that the rate of pressure rise is no greater than 10 bar per degree of crank angle rotation, since greater pressure rise can generate unwanted noise and more rapid engine wear, and also promotes higher temperatures (and thus increased fuel consumption owing to heat transfer losses, as well as NOx production).

Use of the foregoing RCCI methodology tends to result in much lower peak combustion temperatures—as much as 40% lower—than in conventional diesel engines, owing to the increased control over the combustion process. This deters NOx formation, and additionally increases engine efficiency because less energy loss occurs from the engine through heat transfer. Further, the reactivities, amounts, and timing of the fuel charges can be adapted to optimize combustion such that there is less unburned fuel left at the end of the expansion stroke (and thus lost to the exhaust), thereby also enhancing engine efficiency, and also generating less soot.

Experimental results of the RCCI methods operating with diesel and gasoline fuels yielded a net indicated thermal efficiency of up to 53%, and a gross thermal efficiency of about 56%. (Thermal efficiency is a useful measure of fuel efficiency, as it represents the amount of fuel converted to output power by the engine, as opposed to being lost via heat transfer, exhaust, or other variables. Net thermal efficiency takes account of work output over the entire engine cycle, whereas gross thermal efficiency only takes account of the expansion and compression strokes, with an approximately 3% difference between the two being common.) In contrast, at the time the RCCI methods were first developed, the average conventional diesel engine had a thermal efficiency of approximately 42%, and the average gasoline engine had a thermal efficiency of approximately 25-30%. In short, the RCCI methods yielded exceptionally high fuel efficiency. At the same time, they met U.S. governmental soot emissions limits, NOx emissions limits, and fuel consumption limits for the year 2010 without the need for exhaust gas aftertreatment. Emissions could be lowered even further with the implementation of measures such as exhaust after-treatment.

However, further experimentation found that with decreasing engine load, RCCI methods did not function as well. As noted in the prior application, in versions of the invention using diesel fuel and gasoline, the invention required greater amounts of (higher-reactivity) diesel fuel and lesser amounts of (lower-reactivity) gasoline as load decreased. Below loads of approximately 4 bar IMEP, and particularly at idle (i.e., less than about 1 bar), the engine effectively operated as a conventional diesel engine, with minimal or no use of gasoline and only using diesel fuel. This yielded conventional low-load diesel performance, i.e., lower thermal efficiency and undesirably high emissions. Since many diesel engine applications—most notably automotive applications—require idling and other low-load operation, it is desirable to develop adaptations to the foregoing RCCI methods that allow low-load operation while using the fuel reactivity stratification described above—and yielding its benefits as described above—rather than operating as a conventional diesel engine with typical (and undesirable) diesel emissions.

DETAILED DESCRIPTION OF EXEMPLARY VERSIONS OF THE INVENTION

The invention, which is defined by the claims set forth at the end of this document, is directed to diesel engines and diesel combustion methods which allow use of the aforementioned fuel reactivity stratification at low loads, and which at least partially provide the aforementioned beneficial results of reactivity stratification. Following is a brief summary of preferred versions of the invention, with more details being provided elsewhere in this document.

Figure 2:
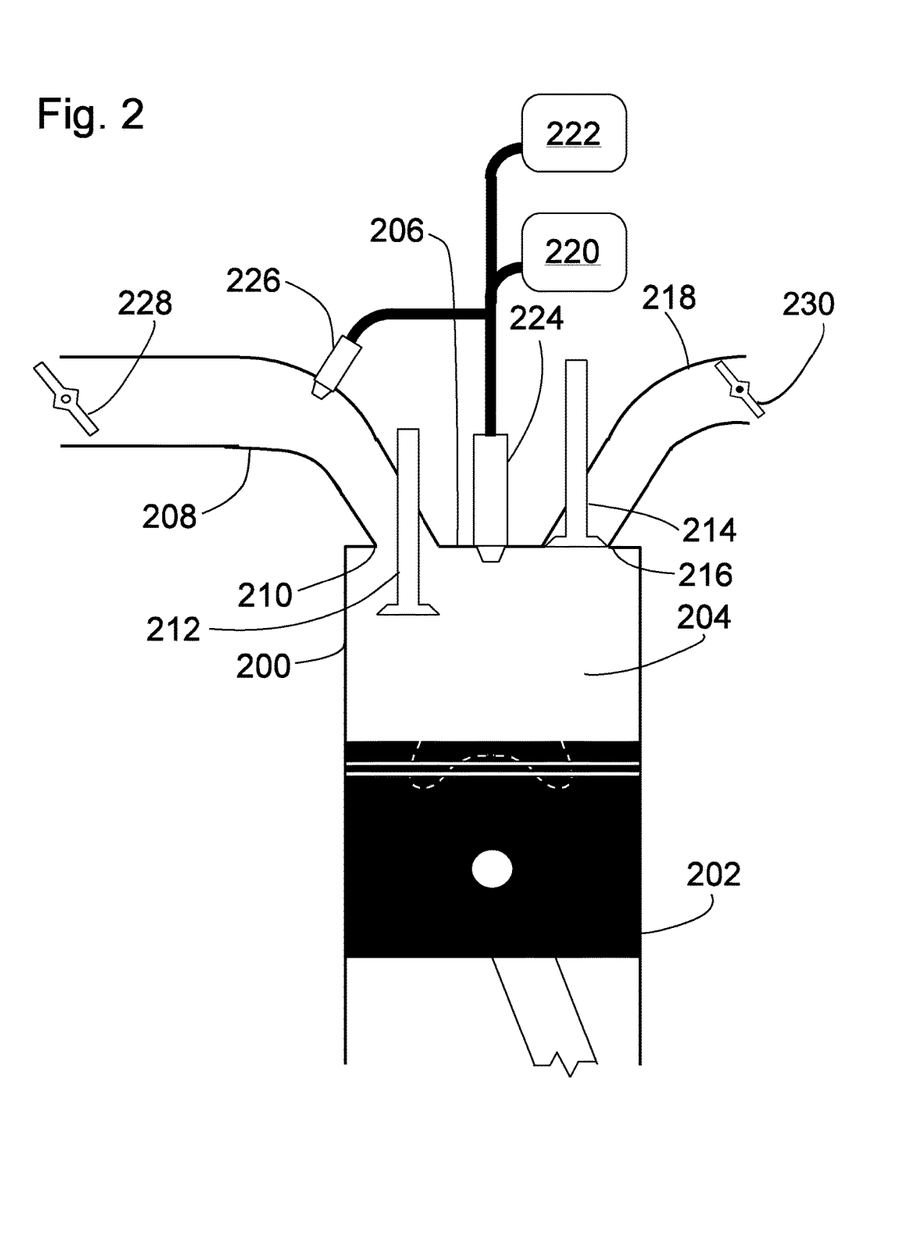
FIG. 2 is a simplified depiction of a diesel engine suitable for practicing the invention, wherein a throttle 222 is used to restrict air intake such that the combustion chamber 204 contains air at sub-atmospheric pressure at the start of the compression stroke.
Figure 3A:
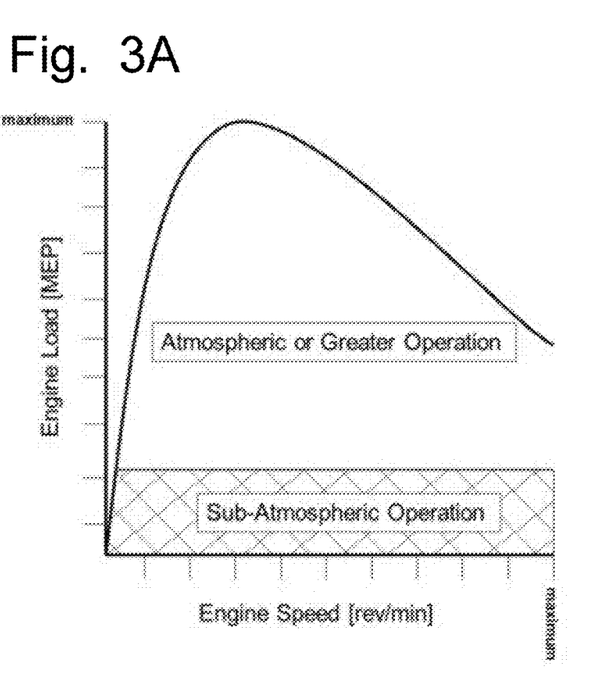
FIG. 3A is an exemplary plot of load vs. speed for an engine such as that of FIG. 2, illustrating the conditions at which the invention operates (as the cross-hatched region).
Figure 3B:
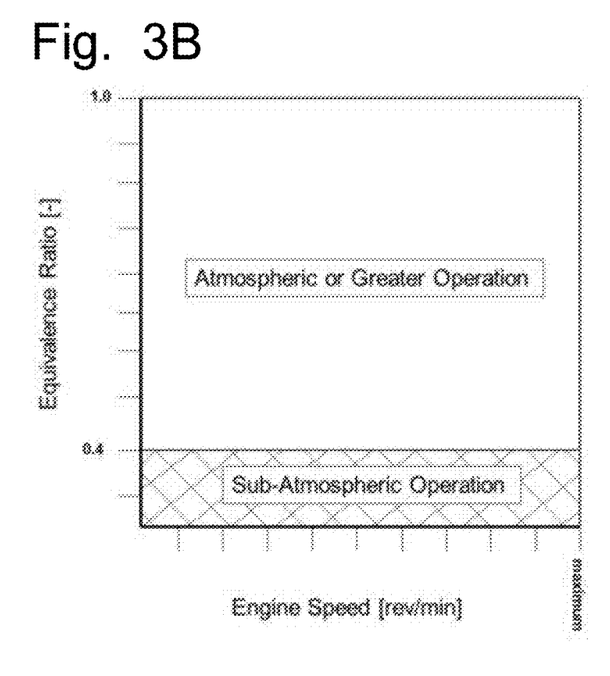
FIG. 3B is an exemplary plot of equivalence ratio vs. speed for an engine such as that of FIG. 2, again illustrating the conditions at which the invention operates, with sub-atmospheric combustion chamber contents preferably being used when an equivalence ratio of less than approximately 0.4 is required.
Figure 4:
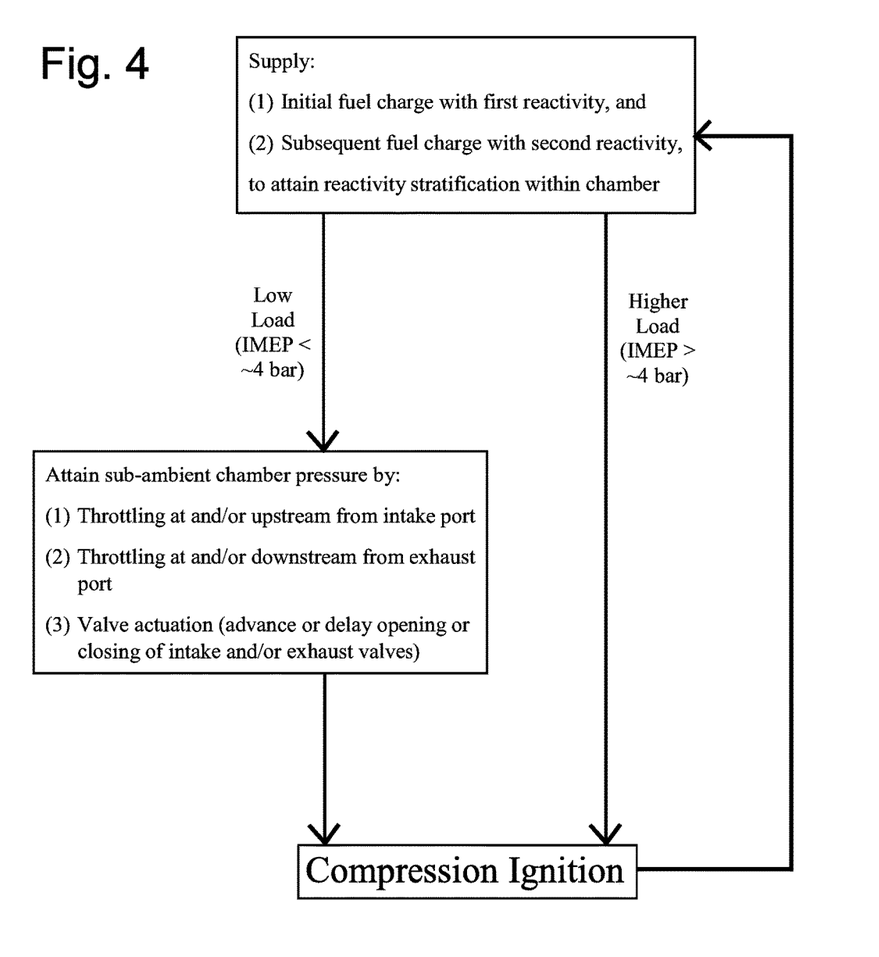
FIG. 4 is a flowchart schematically illustrating an exemplary ignition process in accordance with the principles discussed below.

FIG. 2 schematically depicts an exemplary engine cylinder 200 bearing a reciprocating piston 202 (the piston 202 having a domed face shown as a phantom/segmented line), with a combustion chamber 204 being situated between the piston 202 and the cylinder head 206. An intake manifold 208 opens onto the combustion chamber 204 at an intake port 210 bearing an intake valve 212. Similarly, an exhaust valve 214 is openable and closable within an exhaust port 216 opening onto the combustion chamber 204, with the exhaust port 216 leading to an exhaust manifold 218. Tanks 220 and 222—which, like the other elements shown in FIG. 2, are only illustrated in conceptual form rather than in their true shapes, proportions, and locations—contain materials (fuels and/or fuel additives) having different reactivities, e.g., gasoline in one tank and diesel fuel in the other, gasoline in one tank and a cetane improver in the other, or other arrangements. These materials are supplied to the combustion chamber 204 (possibly after premixing) as fuel charges via a fuel injector 224 situated in the cylinder head 206, and/or via a fuel injector 226 upstream from the intake port 210. The materials from the tanks 220 and 222 can be metered to one or both of the fuel injectors 224 and 226 in any appropriate fashion, e.g., the fuel injector can first inject a gasoline charge followed by a diesel charge, or can first inject a gasoline charge followed by a gasoline charge containing cetane improver, etc.

As noted previously in this document (and in the prior patent application), charges from the tanks 220 and 222 can be injected into the combustion chamber 204 with timings and fuel amounts that result in a stratified reactivity distribution within the chamber 204, and in a combustion profile engineered for superior work output, complete fuel oxidation (and thus lesser soot), and controlled temperature (and thus lesser NOx). However, this RCCI methodology did not work well at low engine loads (IMEP less than approximately 4 bar) and at idling (IMEP less than approximately 1 bar), where the engine tended to require the use of only the high-reactivity fuel (e.g., diesel), and tended to have work and emissions outputs typical of conventional diesel operation. However, it was determined that if the pressure in the combustion chamber is below ambient air pressure at the start of the compression stroke—i.e., if air intake is restricted during the intake stroke—conventional RCCI performance and benefits, as described above, can be attained at low load and idling conditions.

There are two preferred methods for achieving the desired sub-ambient pressure. Initially, a throttle 228 can be provided upstream from the intake port 210, with the throttle 228 being adjustable between an open state (a state allowing maximum airflow from the intake manifold 208 to the intake port 210) and a closed state (a state allowing minimum airflow from the intake manifold 208 to the intake port 210). The throttle 228 can be at least partially closed during at least the intake stroke of the engine combustion cycle, such that the intake manifold pressure during this time—which is usually at ambient atmospheric pressure if no throttling is used—is negative owing to the suction of the intake stroke. Thus, the throttle is used to restrict the air entering the combustion chamber, and thereby adapt the equivalence ratio in the combustion chamber to a level such that RCCI methods can be used effectively. It is notable that in conventional diesel engines, throttles are generally not provided, or where they are provided, they are used for exhaust gas remediation (e.g., for regeneration of particulate traps or for control of exhaust gas recirculation) rather than being used for combustion control.

As an alternative (or addition) to throttling upstream from the intake port 210, variable valve actuation can also be used to restrict airflow to the combustion chamber 204, whereby the intake valve 212 is at least partially closed during one or more portions of the intake stroke (e.g., opened late and/or closed early). As a result, throttling effectively occurs at the intake port 210.

Variable valve actuation can also yield similar results if the intake valve 212 is at least partially open during one or more portions of the compression stroke, e.g., where the intake valve 212 is closed shortly after the compression stroke begins. In this instance, part of the contents of the combustion chamber 204 is pushed out the intake port 210 during compression. With appropriate fuel charge timing, amount, and content, the contents of the combustion chamber 204 can be made to resemble those where the intake valve 212 is at least partially closed during one or more portions of the intake stroke. More specifically, by expelling a portion of the air in the combustion chamber 204 so that the amount present during (the remainder of) compression resembles the amount of air that would be present if throttling was used, and by appropriate tailoring of the fuel charge(s), the combustion chamber contents can be made to attain the desired equivalence ratio. A similar result could also be obtained if the exhaust valve 214 is opened during part of the compression stroke, but this is not recommended because a portion of the injected fuel charge(s) will be lost to the exhaust, decreasing efficiency and increasing emissions.

The equivalence ratio may also be adapted as desired by throttling at or downstream from the exhaust port 216, as by appropriate timing of the opening/closing of the exhaust valve 214, and/or by including a throttle 230 in the exhaust manifold). By increasing exhaust back pressure via exhaust manifold throttling, and/or by retaining a small amount of exhaust within the combustion chamber via appropriate timing of the intake valve 212 and/or the exhaust valve 214 (as by opening the intake valve 212 or closing the exhaust valve 214 during a portion of the exhaust stroke), the amount of air within the combustion chamber (and the equivalence ratio) can also be tailored to approximate the sub-ambient conditions that would be attained via intake throttling.

The throttling and valve actuation methods may be used alone or in combination during low load operation, i.e., the desired sub-ambient chamber pressure can be achieved via throttling, variable valve actuation, or via both of these methods, used at either or both of the intake and exhaust sides of the engine, and used in sequence or simultaneously.

To summarize, in a preferred version of the invention, under moderate and higher loads (e.g., above about 4 bar IMEP), the engine of FIG. 2 can be operated with a wide-open throttle, and without intake valve restriction, to perform the RCCI methods discussed in the prior patent application (and with the combustion chamber at or above ambient pressure at the start of the compression stroke). However, at low load and no load (idling) conditions, airflow to the combustion chamber can be restricted during at least the intake stroke to attain a sub-ambient chamber pressure sufficient to allow use of the RCCI methods.

It should be understood that when it is said that throttling can be used, the throttle can assume the form of a conventional throttle plate/blade which pivots into the airflow path prior to or within the intake manifold (in the manner of a butterfly valve), or it may take the form of other types of variable restrictions situated along the air intake path (e.g., in forms resembling gate valves or other types of valves or restrictions).

It is emphasized that the versions of the invention discussed above are merely exemplary, and the invention can be modified in numerous respects. Initially, the low- and high-reactivity fuel charges are not limited to the use of gasoline and diesel, or to the use of gasoline or diesel with a reactivity-modifying additive, and a wide variety of other fuels (with or without additives) might be used instead (with ethanol being an example). The reactivity of a fuel can also be modified by means other than by the addition of an additive (or another fuel), as by altering a fuel's composition, and/or by separating a fuel into lower- and higher-reactivity components, by use of devices on-board a vehicle for cracking, heating, distilling, and/or catalysis along a vehicle's fuel line. Reactivity can also be effectively modified by use of EGR (Exhaust Gas Recirculation) or similar measures, since recirculated exhaust gas can hinder combustion.

As another example, the invention is not limited to the use of only two or three fuel charges, e.g., four or more charges could be used. Further, the invention is not limited to the use of only two levels of reactivity; to illustrate, each of three or more fuel charges may have different reactivity than the other charges. In addition, fuels need not be liquid in form, and gaseous fuels (such as methane/natural gas) might be used.

The invention is also compatible with EGR (Exhaust Gas Recirculation), as noted above, as well as exhaust aftertreatment and other combustion manipulation and emissions reduction strategies. These strategies might reduce emissions even further, and since the emissions resulting from the invention are decreased from those in prior systems, the equipment used to implement the strategies might have longer operating life, and/or may be modified for lesser expense.

In summary, the invention is not intended to be limited to the preferred versions of the invention described above, but rather is intended to be limited only by the claims set out below. Thus, the invention encompasses all different versions that fail literally or equivalently within the scope of these claims.

What is claimed is:

1. A compression ignition combustion method for an internal combustion engine having:
   A. a combustion chamber,
   B. an intake system including:
      I. an intake manifold, and
      II. an intake port downstream from the intake manifold and upstream from the combustion chamber;
   C. an exhaust system including:
      I. an exhaust port downstream from the combustion chamber, and
      II. an exhaust manifold situated downstream from the exhaust port;
   D. a first supply containing a fuel having a first reactivity; and
   E. a second supply containing a material having a second reactivity;
   the method including the following steps during an engine combustion cycle, the cycle having an intake stroke, compression stroke, expansion stroke, and exhaust stroke:
   a. supplying both the fuel and the material into the combustion chamber in two or more fuel charges, and
   b. reducing the amount of air within the combustion chamber by one or more of:
      (1) throttling incoming air at or upstream from the intake port during at least a portion of the intake stroke;
      (2) having the intake port at least partially open during at least a portion of one or more of the engine's compression stroke and the exhaust stroke;
      (3) having the exhaust port at least partially closed during at least a portion of the exhaust stroke;
      (4) throttling outgoing air at or downstream from the exhaust port during the at least a portion of exhaust stroke.

2. The method of claim 1 wherein the fuel and the material define a stratified distribution of fuel reactivity within the combustion chamber during the engine combustion cycle, with regions of highest fuel reactivity being spaced from regions of lowest reactivity.

3. The method of claim 1 wherein:
   a. one or more of the fuel and the material are supplied into the combustion chamber in a first fuel charge;
   b. one or more of the fuel and the material are supplied into the combustion chamber in a second fuel charge, wherein the second fuel charge:
      (1) is supplied into the combustion chamber subsequent to the first fuel charge, and
      (2) has a reactivity different from the reactivity of the first fuel charge.

4. The method of claim 3 wherein the second fuel charge is supplied into the combustion chamber between:
   a. the start of the compression stroke, and
   b. 40 degrees prior to Top Dead Center (TDC).

5. The method of claim 1 wherein the fuel and the material are supplied to the combustion chamber at different times during the engine combustion cycle.

6. The method of claim 1 wherein:
   a. the fuel from the first supply is gasoline, and
   b. the material from the second supply is diesel fuel.

7. The method of claim 1 wherein the material from the second supply has a reactivity greater than that of diesel fuel.

8. The method of claim 7 wherein the method includes the step of mixing the fuel and the material before any of the material is supplied to the combustion chamber.

9. The method of claim 1:
   a. repeated over several combustion cycles, and
   b. thereafter increasing:
      (1) the amount of air within the combustion chamber, and
      (2) the supplied amount of one of the fuel and the material with respect to the supplied amount of the other,
      over several combustion cycles.

10. The method of claim 1:
    a. performed after start-up of the engine, and
    b. wherein the fuel charges do not include the material at start-up of the engine.

11. The method of claim 1 wherein the engine is operating at a load of less than 4 bar Indicated Mean Effective Pressure (IMEP).

12. The method of claim 1:
    a. repeated over several combustion cycles while the engine is operating at a load of less than 4 bar Indicated Mean Effective Pressure (IMEP), and
    b. thereafter increasing:
       (1) the amount of air within the combustion chamber, and
       (2) the supplied amount of one of the fuel and the material with respect to the supplied amount of the other,
       over several combustion cycles while the engine is operating at a load of greater than 4 bar Indicated Mean Effective Pressure (IMEP).

13. A compression ignition combustion method for an internal combustion engine having a combustion chamber situated between:
    A. an intake system adjustable between a fully-open state providing maximum airflow to the combustion chamber and a restricted state having lesser airflow to the combustion chamber, and
    B. an exhaust system adjustable between a fully-open state providing maximum exhaust flow from the combustion chamber and a restricted state having lesser exhaust flow from the combustion chamber,
    the method including the steps of:
    i. supplying an initial fuel charge into the combustion chamber;
    ii. thereafter supplying a subsequent fuel charge into the combustion chamber, the subsequent fuel charge having a different reactivity than the first fuel charge,
    during each of several successive combustion cycles wherein:

a. the engine is operating at a load of less than 4 bar Indicated Mean Effective Pressure (IMEP), and
b. at least one of:
(1) the intake system is in the restricted state during at least a portion of the intake stroke, and
(2) the exhaust system is in the restricted state during at least a portion of the exhaust stroke.

14. The method of claim 13 wherein the initial and subsequent fuel charges define a stratified distribution of fuel reactivity within the combustion chamber during each engine combustion cycle, with regions of highest fuel reactivity being spaced from regions of lowest reactivity.

15. The method of claim 14 wherein the subsequent fuel charge is supplied into the combustion chamber between:
a. the start of the compression stroke, and
b. 40 degrees prior to Top Dead Center (TDC).

16. The method of claim 13 wherein:
a. the engine includes:
(1) a first supply containing a fuel having a first reactivity, and
(2) a second supply containing a material having a second reactivity;
b. the initial fuel charge includes the fuel; and
c. the subsequent fuel charge includes the material.

17. The method of claim 16 wherein:
a. the fuel from the first supply is gasoline, and
b. the material from the second supply is diesel fuel.

18. The method of claim 13:
a. performed after start-up of the engine, and
b. wherein at start-up of the engine, all fuel charges supplied into the combustion chamber during each of the successive combustion cycles have the same reactivity.

19. The method of 13 wherein:
a. the engine includes:
(1) a first supply containing a fuel having a first reactivity, and
(2) a second supply containing a material having a second reactivity;
b. at start-up of the engine, all fuel charges supplied into the combustion chamber during each of the successive combustion cycles include the fuel and exclude the material; and
c. subsequently, at least some of the fuel charges supplied into the combustion chamber during successive combustion cycles include both the fuel and the material.

20. A compression ignition combustion method for an internal combustion engine having:
A. a combustion chamber situated between:
I. an intake system adjustable between a fully-open state providing maximum airflow to the combustion chamber and a restricted state having lesser airflow to the combustion chamber, and
II. an exhaust system adjustable between a fully-open state providing maximum exhaust flow from the combustion chamber and a restricted state having lesser exhaust flow from the combustion chamber,
B. a first supply containing a fuel having a first reactivity;
C. a second supply containing a material having a second reactivity;
the method including the steps of:
a. providing fuel charges to the engine upon start-up of the engine, each fuel charge including the fuel and excluding the material;
b. during post-start-up operation of the engine, providing fuel charges to the engine which include both the fuel and the material.

21. The method of claim 20 wherein one or more of:
a. the intake system is in the restricted state during intake strokes of the engine, and
b. the exhaust system is in the restricted state during exhaust strokes of the engine, upon start-up of the engine.

22. The method of claim 20 wherein one or more of:
a. the intake system is in the restricted state during intake strokes of the engine, and
b. the exhaust system is in the restricted state during exhaust strokes of the engine, when the engine is operating at a load of less than 4 bar Indicated Mean Effective Pressure (IMEP).

23. The method of claim 20 wherein during post-start-up operation of the engine, fuel charges including both the fuel and the material are provided to the engine when the engine is operating at a load of greater than 4 bar Indicated Mean Effective Pressure (IMEP).

24. The method of claim 20 wherein during post-start-up operation of the engine, the fuel and the material define a stratified distribution of fuel reactivity within the combustion chamber during each engine combustion cycle, with regions of highest fuel reactivity being spaced from regions of lowest reactivity.

25. The method of claim 20 wherein during post-start-up operation of the engine, two or more fuel charges having different reactivity are supplied into the combustion chamber during each engine combustion cycle.

26. The method of claim 25 wherein during post-start-up operation of the engine, the second fuel charge has greater reactivity than the first fuel charge during each engine combustion cycle.

27. The method of claim 26 wherein during post-start-up operation of the engine, the second fuel charge is supplied into the combustion chamber between:
a. the start of the compression stroke, and
b. 40 degrees prior to Top Dead Center (TDC).

28. The method of claim 20 wherein:
a. the fuel from the first supply is gasoline, and
b. the material from the second supply is diesel fuel.

29. The method of claim 20 wherein the material from the second supply has a reactivity greater than that of diesel fuel.

* * * * *